United States Patent
Chelchowski et al.

(10) Patent No.: US 7,455,328 B2
(45) Date of Patent: *Nov. 25, 2008

(54) COLLET FOR PIPE COUPLING

(76) Inventors: David Chelchowski, 237 Wakefield Street, Adelaide, South Australia (AU) 5000; Geoffrey Puckett, 27 Slade Crescent, Hallett Cove, South Australia (AU) 5158

( * ) Notice: Subject to any disclaimer, the term of this patent is extended or adjusted under 35 U.S.C. 154(b) by 163 days.

This patent is subject to a terminal disclaimer.

(21) Appl. No.: 10/949,283

(22) Filed: Sep. 27, 2004

(65) Prior Publication Data

US 2005/0084327 A1    Apr. 21, 2005

(30) Foreign Application Priority Data

Sep. 25, 2003    (AU) ............... 2003905673

(51) Int. Cl.
    F16L 21/06    (2006.01)
    F16L 33/00    (2006.01)
    F16L 25/00    (2006.01)
(52) U.S. Cl. ............ 285/323; 285/247; 285/322; 285/339; 285/354; 285/389
(58) Field of Classification Search ........... 285/322, 285/243, 323, 354, 415, 411, 339, 341, 342, 285/389, 247

See application file for complete search history.

(56) References Cited

U.S. PATENT DOCUMENTS

| | | | | |
|---|---|---|---|---|
| 1,158,346 A | * | 10/1915 | Webb | 174/81 |
| 1,939,242 A | * | 12/1933 | Thaheld | 285/115 |
| 2,157,008 A | * | 5/1939 | Owen | 285/95 |
| 2,195,559 A | * | 4/1940 | Briegel | 285/323 |
| 2,726,104 A | * | 12/1955 | Boitnott et al. | 285/98 |
| 3,142,500 A | * | 7/1964 | Wesseler | 285/96 |
| 3,195,933 A | * | 7/1965 | Jacobs | 285/247 |
| 4,431,216 A | * | 2/1984 | Legris | 285/104 |
| 4,508,374 A | * | 4/1985 | Kantor | 285/319 |
| 4,878,697 A | * | 11/1989 | Henry | 285/250 |
| 4,878,698 A | * | 11/1989 | Gilchrist | 285/342 |
| 5,074,599 A | * | 12/1991 | Wirbel et al. | 285/93 |

(Continued)

FOREIGN PATENT DOCUMENTS

EP    0 285 753 A2 *    1/1988    ............... 285/322

(Continued)

*Primary Examiner*—James M Hewitt
*Assistant Examiner*—Jay R Ripley
(74) *Attorney, Agent, or Firm*—O. M. (Sam) Zaghmout; Bio Intellectual Property Services (Bio IPS) LLC (57) ABSTRACT

An annular collet or gripping member radially located within a coupling assembly of the type having a hollow body, nut and an O-ring or seal for connection of a pipe thereto. The collet is axially split, the split defined by first and second generally parallel ends that are of an engageable configuration, typically by one end having a projection and the other end a correspondingly shaped cavity enabling the ends to interlock. In the normal operation of the coupling, the collet exerts a longitudinal force on the O-ring causing a seal. When it experiences an axial force that would normally relatively displace the two ends causing a leak, being engaged to each other this movement is resisted ensuring that the seal is maintained. The present invention also relates to a coupling having such a collet.

13 Claims, 5 Drawing Sheets

U.S. PATENT DOCUMENTS

| | | | | |
|---|---|---|---|---|
| 5,240,289 A | * | 8/1993 | Gottling et al. | 285/24 |
| 5,335,946 A | * | 8/1994 | Dent et al. | 285/243 |
| 5,466,019 A | * | 11/1995 | Komolrochanaporn | 285/343 |
| 5,823,579 A | * | 10/1998 | Mackay | 285/93 |
| 5,833,276 A | * | 11/1998 | Thompson, Jr. | 285/38 |
| 6,019,396 A | * | 2/2000 | Saito et al. | 285/3 |
| 6,161,874 A | * | 12/2000 | Yang | 285/12 |
| 6,257,628 B1 | * | 7/2001 | Nijsen | 285/323 |
| 6,565,125 B2 | * | 5/2003 | Robison, Jr. | 285/104 |
| 6,974,162 B2 | * | 12/2005 | Chelchowski et al. | 285/382.7 |

FOREIGN PATENT DOCUMENTS

| | | | |
|---|---|---|---|
| GB | 2210123 A | * | 9/1987 |
| GB | 2307285 | | 5/1997 |
| WO | WO02/086371 | | 10/2002 |

* cited by examiner

COLLET FOR PIPE COUPLING

CROSS REFERENCE TO RELATED APPLICATIONS

This application claims benefit of Australian provisional patent application no. 2003905673, filed 25 Sep. 2003. The disclosure of the identified patent application is hereby incorporated by reference in its entirety, including all figures.

FEDERALLY SPONSORED RESEARCH

Not Applicable.

SEQUENCE LISTING OR PROGRAM

Not Applicable.

BACKGROUND OF THE INVENTION

1. Field of Invention

The present invention relates to a gripping member or collet of the type used in compression fittings for the connection of pipes. In particular, it relates to an annular collet that includes a generally longitudinal split defining a first and second end of the ring whereby one end is of a configuration to engage the other end to thereby prevent axial distortion of the collet during operation.

2. Background of the Invention

The present applicant is the owner of a number of patents dealing with pipe couplings. One of the applicant's earlier filed patent applications entitled 'Pipe Coupling' (the subject of PCT/AU02/00487) relates to a pipe coupling assembly that is significantly shorter than other pipe coupling assemblies that are generally too long for use in applications such as homes and meter boxes. Although the forthcoming description refers to the collet of the present invention being used in the pipe coupling of the applicant's previous patent, it is to be understood that the collet may well be incorporated into alternate pipe coupling configurations.

The pipe coupling assembly disclosed in PCT/AU02/00487 generally includes a nut, a body, a gripping member and a seal or o-ring. The nut engages the body through appropriate threads and includes a hooked projection having a sloping surface adapted to abut against and provide a force on a corresponding surface of the gripping member within the body. A pipe is inserted through the nut, gripping member and seal into the body. Tightening of the nut causes its sloped surface to engage a front portion of the gripping member that is then forced both radially and longitudinally. Radial compression results in the front portion of the gripping member engaging the pipe whilst longitudinal forcing causes it to be forced into the body simultaneously abutting against and compressing the seal whilst dragging the pipe further into the body.

The gripping member adapted to be used in such pipe coupling assemblies to engage the outer surface of polymeric or metal pipes are annular collets and have at their front portion inwardly directed barbed projections to thereby grip the pipes being connected. Molding of such rings requires them to be axially split so that they may be successfully jumped off a molding tool. The gripping member further includes a rear portion that is adapted to be located radially within the body such that the split ends abut. In order for leakage to be minimized or prevented, the rear face of the rear portion of the ring must uniformly compress the seal at all times during operation.

Various tests on the pipe coupling assembly of PCT/AU02/00487 have proven it to be a viable and successful alternative to larger known pipe coupling assemblies. However, it has been found that under significant pipe bending, the split ends of the gripping member axially distort thereby forming a non-uniform compression of the seal. The pipe coupling assembly therefore becomes prone to leakage.

It is therefore an object of the present invention to provide a gripping member or collet for pipe coupling that overcomes the abovementioned problems or at least provides the public with a useful alternative. The invention therefore relates to a collet having a split end configuration that prevents or at least seeks to minimize axial distortion of the ring.

SUMMARY OF THE INVENTION

In one form of the invention there is therefore proposed an annular collet radially located within a coupling assembly of the type having a hollow body, nut and an O-ring or seal for connection of a pipe thereto said collet including:

at least one split extending generally axially said split defining corresponding first and second generally parallel ends of said collet said first end including at least one substantially circumferentially extending projection adapted to engage a correspondingly shaped cavity associated with said second end, thereby preventing or at least minimizing axial movement of one of said ends relative to the other.

In preference said first and second ends are generally parallel to each other and to the longitudinal axis of said collet.

In preference said collet includes a rear portion having a first surface generally parallel to an inner surface of said body and a second rear surface adapted to abut a surface of said seal, and a front portion including radially inwardly directed barbs and an outwardly converging front surface.

In preference when said collet is located radially within said coupling assembly said corresponding first and second ends are engaged.

In an alternate preference said first and second ends are of a roughened configuration thus frictionally engaging each other.

In a further form of the invention there is proposed a coupling for connection of a polymeric pipe, said coupling including;

a hollow body having an external thread extending at least in part theralong and having an inner surface;

a nut threadably engaging said body external threads, said nut having at one end an internal thread co-operable with said body external thread and including a hooked projection adapted to extend over at least part of said body inner surface said projection including a first inner surface generally parallel to said body inner surface, a second outwardly converging surface extending from the inner edge of said inner surface;

a deformable gripping member having a first surface generally parallel to said body inner surface and having a second outwardly converging outer surface extending from said first surface, said member including radially inward barbs and at least one split extending generally axially said split defining a corresponding first and second ends of said gripping member, said first end including at least one substantially circumferentially extending projection adapted to engage a correspondingly shaped cavity associated with said second end, thereby preventing or at least minimizing axial movement of one of said ends relative to the other;

wherein upon tightening of said nut, said nut second surface abuts against and exerts a force on said gripping members second surface both in the longitudinal and radial directions to thereby cause the gripping member to be urged both radially and longitudinally into the body, said nut first surface sliding alongside said body first surface.

In preference said gripping member has moved sufficiently radially inwardly it has engaged the pipe to thereby drag it into the body.

In preference upon further tightening of the nut, said gripping member second surface is caused to slide inwardly against the nut second surface.

In preference said body inner surface is tapered and diverges outwardly of the body so that upon tightening of said nut as the gripping member moves into said body a percentage of the nut first surface abuts against the body inner surface wherein said body thus reinforces said nut against any radial force.

In preference said nut first surface is tapered and converges inwardly so that upon tightening of said nut as the gripping member moves into said body a percentage of the nut first surface abuts against the body inner surface wherein said body thus reinforces said nut against any radial force.

In preference said body inner surface is tapered and diverges outwardly of the body, said nut first surface is tapered and converges inwardly wherein upon tightening of said nut the two surfaces abut against each other until in a fixed position at which time the body reinforces the nut against any radial force.

In preference the taper on the body and the nut is of the same order.

In preference the taper is of the order of several degrees.

In preference said body includes an end adapted to engageably slide into the cavity defined by the nut body and the hooked projection.

In preference said gripping member includes an outer annular lip extending rearwardly from said second surface, said gripping member adapted to abut against said body when the nut is in a non-tightened position wherein as the nut is being tightened it is compressed causing the lip to enter into said body, the outer edge of said lip adjacent the body inner surface to provide for support therefor.

In preference the slope of the gripping member second surface is smaller than the slope of the nut second surface and is selected so that when the nut engages the gripping member and forces it into the body thereby compressing it, the slope of the gripping member second surface is generally the same as the nut second surface.

In preference the slope of the gripping member second surface in its rest state is some 37 degrees, the slope of the nut second surface some 45 degrees.

In preference said nut further includes an annular shoulder extending radially inwardly from the edge of said nut second surface, said stop adapted to be abutted by said gripping member when in its compressed state to thereby provide a resistive force for the gripping member moving longitudinally out of the body.

In preference the width of said nut second surface is greater than the width of the gripping member second surface to thereby accommodate said gripping member second surface sliding alongside said nut second surface as the nut is tightened whilst full surface contact between the two surfaces is maintained.

In preference the width of said nut second surface is some ⅓ greater than the width of the gripping member second surface.

BRIEF DESCRIPTION OF THE PREFERRED EMBODIMENT

The accompanying drawings, which are incorporated in and constitute a part of this specification, illustrate an implementation of the invention and, together with the description, serve to explain the advantages and principles of the invention. In the drawings.

DESCRIPTION OF THE PREFERRED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

As previously stated, it is to be understood that reference to the following pipe coupling assembly is meant by way of example only and the collets embodying the present invention may equally well be used in other pipe couplings and/or transition fittings.

The following description firstly deals with the workings of a pipe coupling assembly 10 in which a collet 12a (also sometimes referred to as a grip-ring or gripping member) according to a first embodiment is housed, followed by an explanation of the way in which the collets 12a, 12b and 12c overcome the problems encountered with previously known collets.

Figure 1:
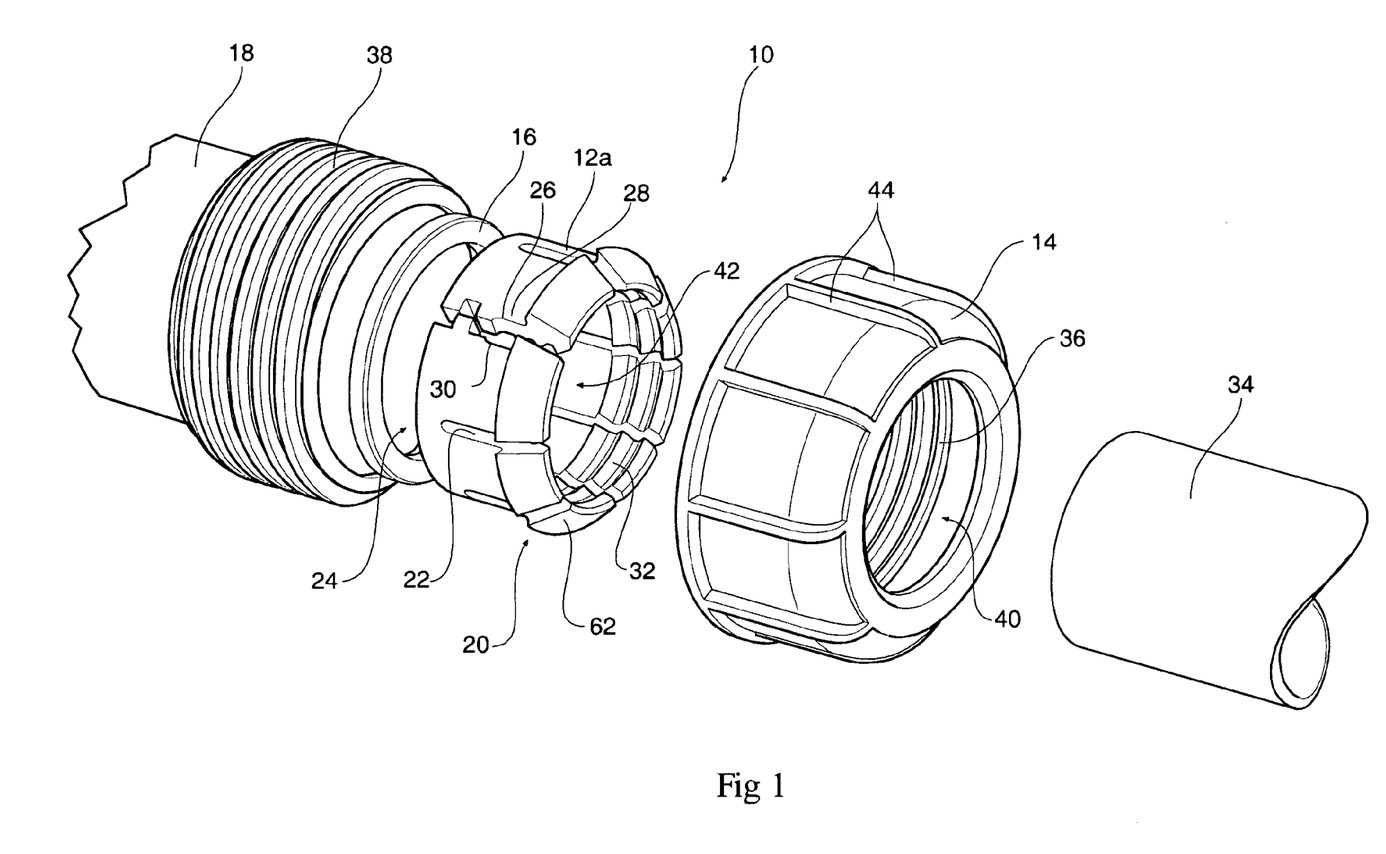
FIG. 1 is an exploded view of a pipe coupling assembly including a collet according to a first embodiment of the present invention.

FIG. 1 illustrates an exploded view of a pipe coupling assembly 10 incorporating therein a collet 12a according to a first embodiment of the present invention. The coupling 10 includes a nut 14, the collet or grip-ring 12a, seal 16 and a body 18. Collet 12a includes a front portion 20 having partial splits 22 since it must be radially and thereby circumferentially deformable, and a rear portion 24 which remains radially located within the body 18. That is, the collet 12a is imprisoned within the body and once located cannot expand. Grip-rings 12a of this type include a split 26 for ease of manufacture so that they may easily be jumped off a molding tool (not shown). Split 26 is defined by two ends 28 and 30 of the collet 12a that are of a configuration later described and explained. The collet 12a further includes radially inwardly and axially spaced barb projections 32. The partial splits 22 of the collet 12a enable the front portion 20 of the gripping member 12a to be radially compressed so that the barbs 32 engage the pipe 34.

The nut includes female threads 36 that engage corresponding male threads 38 on the body 18. In use and prior to tightening of the nut 14, pipe 34 is inserted though the aperture 40 of the nut 14 and through the bore 42 of the collet 12a.

To aid in rotating the nut 14, circumferential projections or ribs 44 assist with maintaining a hand or tool grip.

Figure 2:
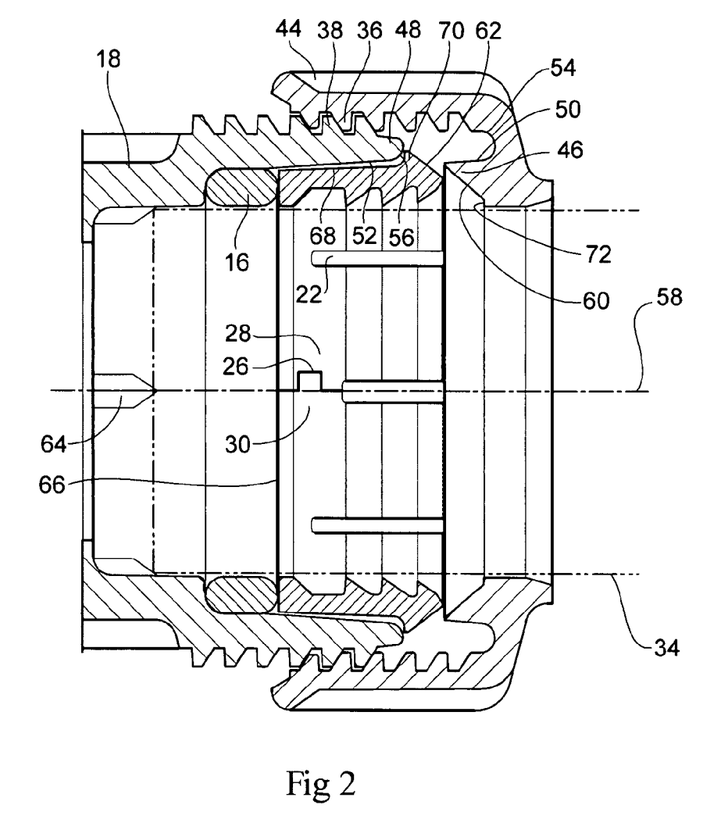
FIG. 2 is a cross-sectional drawing of the coupling of FIG. 1 prior to the nut having been tightened.

Referring now to FIG. 2, the nut 14 includes a hooked projection 46 extending or enveloping around end 48 of the body 18 and having an inner surface 50 which is at least partially tapered, typically at an angle of a few degrees, designed to match the taper on the body surface 52. When the nut 14 is tightened and nut surface 54 and body surface 56 abut or are at least close to each other, the tapers on the surfaces 50 and 52 also abut and are effectively locked together. This has the combined effect of reinforcing that section of the nut since any outward radial forces experienced by the nut are also transferred to the body. The nut is effectively "tied" to the body and together they form a more rigid assembly. This assembly provides several advantages.

Surfaces 50 and 52 do not necessarily have to be tapered and can well remain generally parallel to the longitudinal axis 58 of both the coupling 10 and the pipe 34. Furthermore, it may not be necessary for both the body and the nut surfaces to be tapered for only one need be so. The key is that there is a taper so that as the gripping member moves into the body the two surfaces are caused to approach each other. Whether it is therefore the body or the nut that is tapered is not critical. The best configuration would of course be both tapered. In plastics the variability of dimensions is quite varied and it is unlikely that both would have the same taper anyway.

The reinforcing also assists in resisting bending forces that may be applied by the pipe 34 to the coupling 10. The interlocking between the nut and the body prevents the nut from moving on the body and thus ensures a seal is maintained.

In the unscrewed position as is shown in FIG. 2 it may be preferable but not essential that at least a part of the nut projection 46 extends into the body end 48. This assists in ensuring that upon tightening of the nut, the nut projection glides smoothly into the body rather than being caught at the end of the body.

The hooked projection 46 further includes an inwardly diverging surface 60 whose surface has a shape and slope correspondingly matching the outwardly converging tapered surface 62 on the collet front portion 20. As the nut 14 is tightened the nut surface 60 abuts and bears against the collet surface 62. Since both the nut and the collet surfaces are at an angle to the longitudinal axis 58 of the coupling 10, the front portion 20 of the collet 12*a* will experience both a radial and a longitudinal force.

During insertion of the pipe 34 into the body 18, the pipe 34 will abut against projections 64. With the nut in the unscrewed position, the barbs 32 have not engaged the pipe 34, and the surfaces 60 and 62 of the nut 14 and the collet 12*a* respectively are apart.

As mentioned, initial tightening of the nut 14 on the body 18 will cause abutment of the nut surface 60 against the corresponding surface 62 of the collet 12*a*. The radial force compresses front portion 20 and causes the barbs 32 to bite into and engage the pipe 34, thereby dragging it into the body 18 and over the projections 64.

Simultaneously, rear surface 66 of the rear portion 24 of the collet 12*a* abuts and begins to compress seal 16 that is trapped between the collet and an inner abutment surface of the body to provide a seal for the pipe 34. It is important for this abutment to be uniform across the entire surface of seal 16, a factor that will be later discussed. As one further tightens the nut 14, the nut stop surface 54 approaches the body stop surface 56 and the space in between the two is progressively reduced as the nut is tightened. Of course, in some instances, the seal may be attached to the collet with the seal then compressing against the body inner abutment surface.

Figure 3:
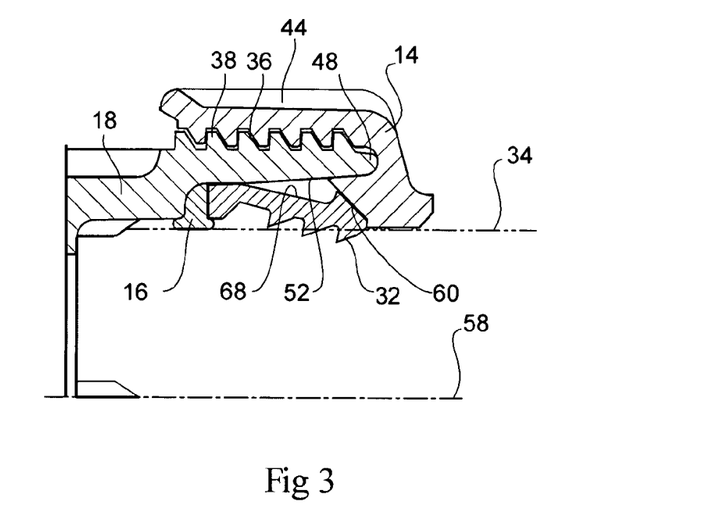
FIG. 3 is a cross-sectional drawing of the coupling of FIG. 1 when the nut has been fully tightened.

Further tightening of the nut compresses the sealing or O-ring 16, and causes the front portion 20 of the collet 12*a* to be radially compressed even further so that its outer surface 68 moves away from the inner surface 52 of the body 18, that is, it bends inwards. The nut can then travel further until either the nut stop surface 54 and the body stop surface 56 abut, or the collet 12*a* resists any further radial and longitudinal motion. This now indicates to the user that an effective seal has been effected. FIG. 3 illustrates the nut being fully tightened on the body where the inward bending of the collet can be clearly seen.

Those skilled in the art will appreciate that the configuration of the nut as described above provides for a working surface that by exerting a force on the gripping member causes both a seal of the coupling to a pipe as well as a holding force resisting the pipe from disengaging from the coupling. This pipe coupling assembly as disclosed in PCT/AU02/00487 made from molded or extruded plastics and/or metal possesses sufficient strength to lock the pipe to the coupling without requiring a longer nut structure.

The present configuration also assists in securing a pipe to the coupling when a tensile or axial load is applied to the pipe. As a load is experienced by the pipe causing it to experience a force in the longitudinal direction 58 out of the body 18, the configuration of the surface 60 and 62 on the nut 14 and collet 12*a* respectively results in the collet 12*a* further being compressed as it is pulled outwardly from the body. One potential difficulty with this type of arrangement is that the compression on the seal is reduced. For that reason it is important that care be paid to the relative slope of the surfaces on the nut and the gripping member. On the one hand one desires to have a slope so that tightening or screwing of the nut results in the compression of the gripping member to engage the pipe. On the other hand one has to ensure that the angle is not so great that a longitudinal force on the pipe will allow for excessive movement of the gripping member outwardly of the body.

The angle of the slopes of the surfaces 60 and 62 may be set generally at an angle of 45 degrees. However, the angle may be modified so that different ratios of forces on the collet 12*a* can be chosen. For example, if the angle of the slope in relation to the longitudinal axis of the coupling is 30 degrees then the ratio of the longitudinal to the radial forces experienced by the collet is no longer 1:1 but will be related to the sine of the angle. Changing this angle then allows one to control the relative forces experienced in the two directions.

One can now appreciate that as the nut is tightened the two wedge like surfaces meet on top of each other. However, as the nut is tightened further, the collet 12*a* experiences a radial force causing the front surface 62 of the collet to be also pushed inwards resulting in the relative angle of the nut surface 60 and collet surface 62 to change. Since it is more critical that a tightened nut possess the relative strength, it is desirable that the surfaces 60 and 62 are relatively parallel and flat on top of each other when the nut has been tightened rather than at the initial engagement. For that reason, the initial slope of collet surface 62 is shallower than that of the nut, that is, closer to the longitudinal axis 58 of the coupling 10.

Collet 12*a* further includes a lip 70. Inclusion of the lip 70 overcomes potential operating difficulties in that when coupling 10 has been assembled with a pipe 34, lateral forces exerted on the pipe may move the front surface 62 of the collet 12*a* across the surface 60 of the nut 14, much like that seen in ball-joint arrangements. The lip 70 therefore reinforces the collet 12*a* by providing an extra support point along its length that engages the body 18 when the nut 14 is in a tightened position. The lip 70 is initially of a greater diameter than the inner diameter of the body at end 48 in that it can sit flush against part of the body stop 56 when in an uncompressed state. When the nut is being tightened the collet front portion 20 then slips into the body under the longitudinal and radial forces exerted by the nut. Although not shown, it should be understood that the angle between the lip and the gripping member is of an arcuate shape rather than being a right angle and that assists in the collet slipping into the body and over the body end 48.

As the collet slides into the body, the edge of the lip 70 abuts the inner body surface so that the collet engages the body both at the front and its rear ends thus ensuring that it resists rotation with respect to the body, that is, its longitudinal axis remains generally co-axial with the rest of the coupling even when a lateral force is applied to the pipe and the collet.

The lip 70 on the collet also provides the additional advantage in assembly of the coupling. When the collet is being inserted into the body, use of the lip 70 ensures that it is inserted in the right orientation.

FIGS. 2 and 3 also illustrate the advantage of having the initial slope of the collet surface 62 being shallower than that of the nut surface 60 as discussed above. As shown, as the nut is tightened and the front end of the collet is radially compressed, the relative slope between these two surfaces changes so that when in the normal operating position, the two surfaces are generally parallel. In some cases, as shown in FIG. 3, the collet is forced significantly inwardly away from the body.

The dimension of the surface 60 of the nut 14 is also of a greater dimension than the surface 62 of the collet 12a. This allows the surface of the collet to totally abut against the surface of the nut even when it has moved along the nut surface (comparing FIGS. 2 and 3) to allow for their relative sliding motion.

To further assist in securing the pipe within the body of the coupling the nut includes a stop 72 that prevents the collet 12a from being pulled out of the body 18 when the coupling is in the tightened state. Therefore, extending inwardly from the wedge surface is an annular shoulder 72 that is generally perpendicular to the longitudinal axis 58 of the coupling 10. As would be appreciated by the skilled addressee, this has the effect of preventing the collet 12a from being pulled out of the coupling 10 since it will directly abut against the lip 72 and will not allow the collet to move further outward. This stop is now absolutely necessary for the coupling to work.

The above description focused on the general workings of the pipe coupling assembly 10 and how tightening of the nut 14 affects the collet 12a and seal 16 housed within the body 18. The description and explanation hereon refers directly to the collet itself and the importance of the split 26 there through. Various embodiments of the collet, that is 12a, 12b and 12c will be discussed and it is to be understood that these further embodiments operate within the pipe coupling assembly in the same way as described above, the difference residing in the engagement of their ends.

As previously discussed, it has been found that upon significant bending or transverse movement of pipe 34, coupling assemblies incorporating therein gripping members having longitudinal splits are prone to leakage. This occurs due to the fact that the split extends in a direction parallel with the longitudinal axis 58 of the coupling 10 without any radial deviation. This means that their ends are free to slide at their abutting surfaces. Therefore under extreme bending conditions, their ends axially distort and the rear surface of the collet no longer uniformly abuts and compresses the seal resulting in leakage there through. The collets 12a, 12b and 12c of the present invention therefore prevent or at least minimize axial distortion of their engageable ends, as explained below.

Figure 4:
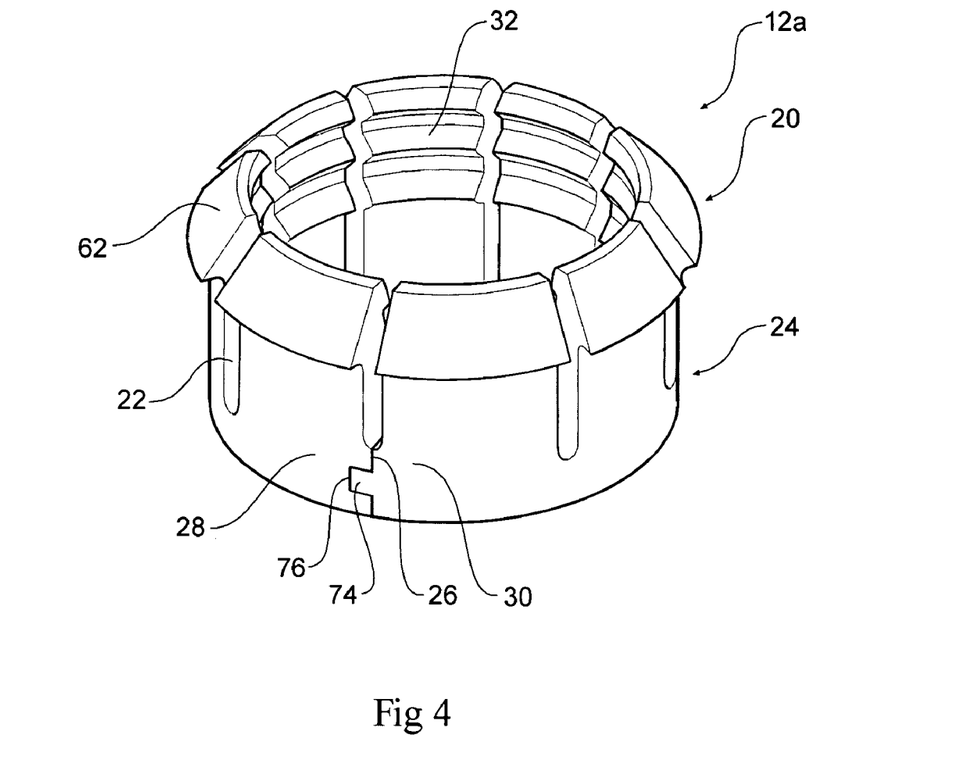
FIG. 4 is a perspective view of the collet of FIG. 1 according to a first embodiment of the invention.

FIG. 4 illustrates the collet 12a according to a first embodiment of the invention and is illustrated previously in the pipe couplings of FIGS. 1-3. End 30 includes a right-angled projection 74 that is adapted to engage a correspondingly shaped cavity 76 in end 28. Therefore, under the abovementioned conditions, the tendency for the ends 28 and 30 to longitudinally shift is prevented due to the abutting surface provided by the projection 74. The skilled addressee would realize how engagement of the ends in this manner effectively prevents relative axial movement of the ends 28 and 30.

Figure 5:
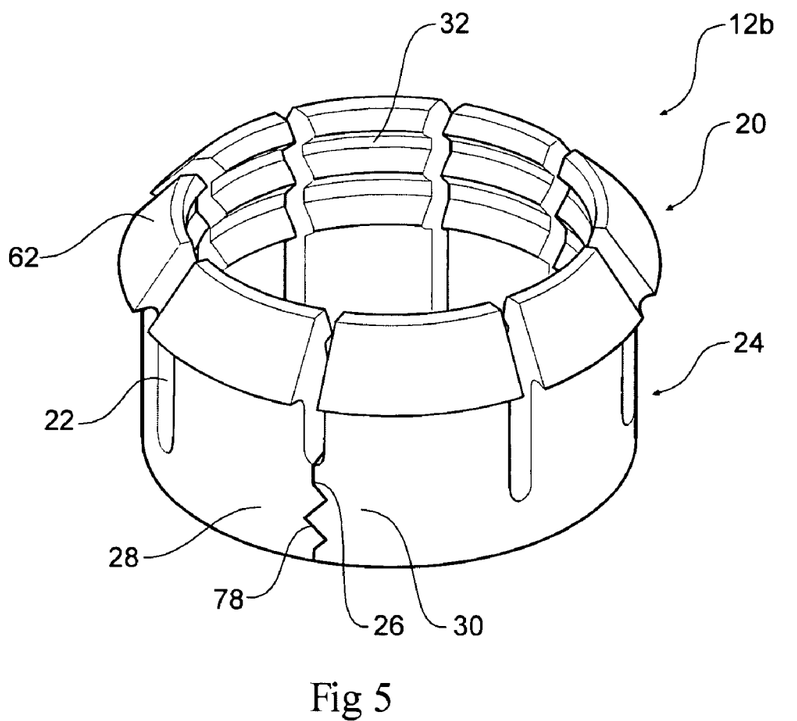
FIG. 5 is a perspective view of a collet in accordance with a second embodiment of the invention.

Those skilled in the art would further realize that the configuration of the ends need not be in the form of a circumferentially extending right-angled projection being housed within a corresponding cavity. Illustrated in FIG. 5 is a collet 12b incorporating an alternately configured split 26 extending there through. More specifically, the split in collet 12b incorporates a saw-tooth configuration 78 having diagonal abutting surfaces. Collet 12b functions in the same way as that of collet 12a in that axial movement of the ends are prevented due to the abutting surfaces provided by the saw-tooth configuration.

Figure 6:
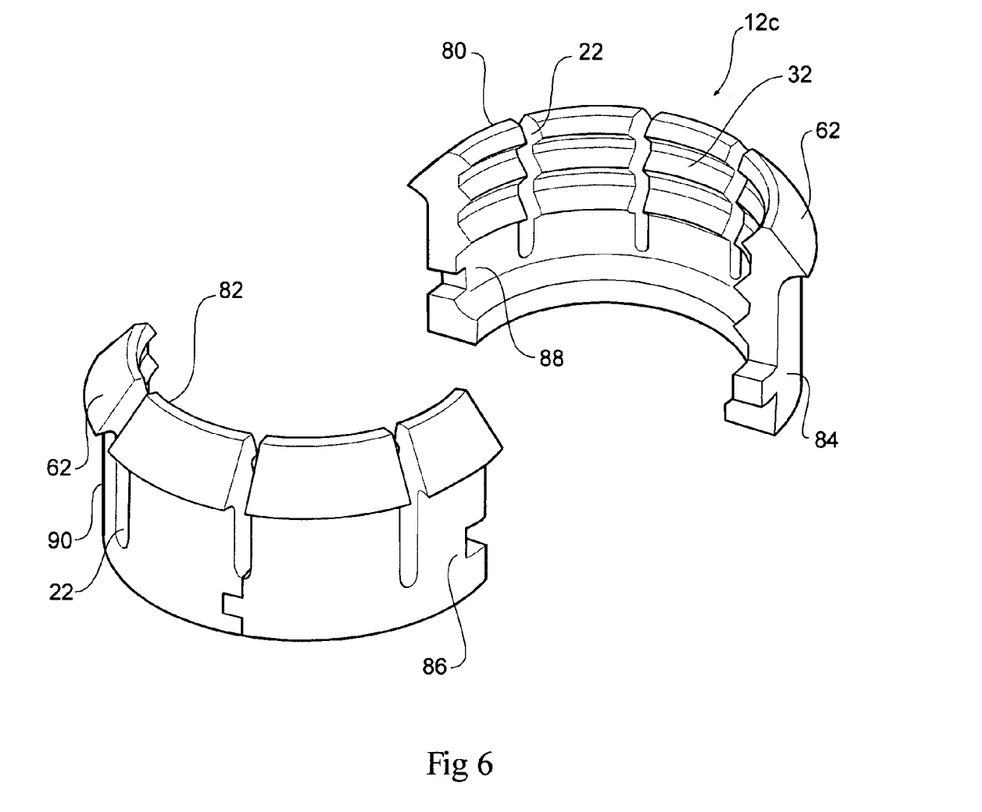
FIG. 6 is a perspective view of a collet in accordance with a final embodiment of the invention.

Should a single split in the collet not suffice in overcoming the tendency for the ends 28 and 30 to axially distort upon transverse movement of pipe 34, the collet may be formed of several individual pieces and together define two or more engaging splits. The collet 12c of FIG. 6 illustrates this third embodiment of the invention whereby the collet comprises two halves 80 and 82. In this figure, the engaging ends 84 and 86, and ends 88 and 90 are of the same configuration as that of the first embodiment and will therefore not be described in detail. End 88 of half 80 is in the form of a cavity while end 84 of half 80 is in the form of a projection. This opposed manner of engagement ensures a more secure locking mechanism. When a bending force is applied to the pipe 34, there now exist two mechanisms by which axial distortion of the collet 12c will be prevented.

In each of the above embodiments, it is important to realize that a number of different engaging end configurations may be implemented. The invention is therefore not intended to be limited to the collet end shapes as illustrated in the Figures but rather any shape that incorporates a circumferential extension of one end adapted to engage a correspondingly shaped second end. It may be indeed even be that the ends defining the split are simply very rough where the ends engage each other by simple frictional engagement.

Those skilled in the art should now appreciate the advantages of a pipe coupling assembly incorporating a collet embodying the present invention. Pipe bend tests carried out by the applicant that have failed in the past using longitudinally split collets have now been carried out successfully using the collet of the present invention. It has been seen that the rear surface of the collet continues to uniformly abut and compress the seal even under extreme bending conditions to thereby successfully seal the pipe to the coupling.

It is also to be understood that although the above description related to a particular pipe coupling including a nut having a hooked projection, the present invention may equally well be used on other standard pipe couplings. That is, even in standard couplings where it may be that one wishes to minimize any distortion of the collet, a collet of the type described above would achieve this premise. It is therefore to be clearly understood that the collet of the present invention is not to be limited to use in the pipe coupling as described in this specification, that being rather by way of example in relation to an extreme case where such a collet is useful.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

The invention claimed is:

1. An annular collet radially located within a coupling assembly for connection of a pipe thereto, said coupling assembly having a hollow body, an internal abutment surface disposed inside said hollow body, a nut having a hooked projection that extends into said hollow body when engaged, and an annular seal that abuts against said abutment surface, said collet including:
    an annular rearward portion, which includes a surface generally parallel to an inner surface of the body which permits this portion to slide into the body such that the rearward portion abuts against said annular seal, and a forward portion which includes a plurality of radially deformable barb sections as gripping means to grip the pipe;
    said annular rearward portion including at least one split extending generally axially there along, said at least one split defining corresponding first and second generally parallel ends of said collet rearward portion, said generally parallel ends abutting one another;
    said rearward portion first end including at least one substantially circumferentially extending projection which engages a correspondingly shaped cavity associated with said rearward portion second end, thereby preventing or at least minimising axial movement of one of said rearward portion ends relative to the other.

2. An annular collet as in claim 1, wherein said first and second rearward portion ends are generally parallel to each other and to the longitudinal axis of said collet.

3. A coupling for connection of a polymeric pipe, said coupling including:
    a hollow body having external threads extending at least in part there along, an inner surface, and an abutment surface extending inwardly from said inner surface for accommodating an annular O-ring;
    a nut threadably engaging said hollow body external threads, said nut having, at one end, internal threads co-operable with said body external threads and including a hooked projection that extends over at least part of said body inner surface when engaged, said hooked projection including a first surface generally parallel to said body inner surface and a second outwardly converging surface;
    a deformable gripping member including a rearward portion that abuts against said O-ring, and a forward portion having a first surface generally parallel to said body inner surface and having a second outwardly converging outer surface extending from said first surface, and further including radially deformable barb sections as gripping means to grip the pipe;
    said rearward portion including at least one split extending generally axially, said at least one split defining corresponding first and second ends of said first portion, said first end including at least one substantially circumferentially extending projection which engages a correspondingly shaped cavity associated with said first portion second end, thereby preventing or at least minimising axial movement of one of said first portion ends relative to the other;
    wherein upon tightening of said nut, said nut's second outwardly converging surface abuts against and exerts a force on said gripping member's second outwardly converging surface both in the longitudinal and radial directions to thereby cause the gripping member to be urged both radially and longitudinally into the body, said hooked projection first surface sliding alongside said body inner surface.

4. A coupling as in claim 3 wherein upon tightening of the nut, said gripping member second surface is caused to slide inwardly against the nut hooked projection second surface.

5. A coupling as in claim 3 wherein said body inner surface is tapered and diverges outwardly of the body so that upon tightening of said nut, as the gripping member moves into said body, a percentage of the nut first surface abuts against the body inner surface wherein said body thus reinforces said nut against any radial force.

6. A coupling as in claim 5 wherein the taper is of the order of several degrees.

7. A coupling as in claim 3 wherein said nut first surface is tapered and converges inwardly so that upon tightening of said nut, as the gripping member moves into said body, a percentage of the nut first surface abuts against the body inner surface wherein said body thus reinforces said nut against any radial force.

8. A coupling as in claim 3 wherein:
    said body inner surface is tapered and diverges outwardly of the body;
    said nut hooked projection first surface is tapered and converges inwardly;
    wherein upon tightening of said nut the body inner surface and hooked projection first surface abut against each other until in a fixed position, at which time the body reinforces the nut against any radial force.

9. A coupling as in claim 8 wherein the taper on the body and the nut is of the same order.

10. A coupling as in claim 3 wherein said body includes an end that engageably slides into the cavity defined by the nut body and the hooked projection.

11. A coupling as in claim 3, said nut further including an annular shoulder extending radially inwardly from the edge of said nut second surface, said annular shoulder is abutted by said gripping member when the gripping member has been urged radially and longitudinally into the body through tightening of the nut, to thereby provide a resistive force for the gripping member moving longitudinally out of the body.

12. A coupling as in claim 3 wherein the width of said nut second surface is greater than the width of the gripping member second surface to thereby accommodate said gripping member second surface sliding alongside said nut second surface as the nut is tightened whilst full surface contact between the two surfaces is maintained.

13. A coupling as in claim 12 wherein the width of said nut second surface is some ⅓ greater than the width of the gripping member second surface.

* * * * *